United States Patent [19]

Watson et al.

[11] 3,886,112

[45] May 27, 1975

[54] POLYVINYL ALCOHOL BASED COMPOSITION AND ARTICLES MADE THEREFROM

[75] Inventors: John J. Watson, Woodside; Alice W. Pucknat, New York, both of N.Y.

[73] Assignee: Polymer Films Inc., Woodside, N.Y.

[22] Filed: Dec. 17, 1973

[21] Appl. No.: 424,945

[52] U.S. Cl. .......................................... 260/33.4 R
[51] Int. Cl. ............................................ C08f 45/34
[58] Field of Search ................ 260/33.4 R, 91.3 VA

[56] References Cited
UNITED STATES PATENTS

| | | | |
|---|---|---|---|
| 2,376,371 | 5/1945 | Lowe et al. | 117/34 |
| 2,671,022 | 3/1954 | Sargent et al. | 260/91.3 VA X |
| 3,516,960 | 6/1970 | Martins et al. | 260/33.4 R |

*Primary Examiner*—Lewis T. Jacobs
*Attorney, Agent, or Firm*—Albert F. Kronman

[57] ABSTRACT

Disclosed is a plastic composition which is insoluble in small volumes of water including body fluids and soluble in large volumes of water and consisting of partially hydrolyzed polyvinyl alcohol resin with a gelling amount of a water soluble borate salt.

This composition is moldable, extrudable and resilient. It can be formed into film and various shaped objects such as toys and disposable sanitary napkin barrier films.

6 Claims, 3 Drawing Figures

3,886,112

POLYVINYL ALCOHOL BASED COMPOSITION AND ARTICLES MADE THEREFROM

BACKGROUND OF THE DISCLOSURE

This invention is directed to a novel plastic composition, to articles made therefrom and to a method of forming such compositions. More specifically, the invention relates to a plastic, based on polyvinyl alcohol exhibiting limited water soluble characteristics and containing plasticizers and a metal borate salt.

The present invention provides novel compositions of matter which are insoluble in small amounts of water including body fluids, but soluble in large volumes of water such as the flushing amount provided by the city water systems. The composition of matter according to the invention can be shaped by molding or extruding. It can readily absorb coloring agents of all types and is resilient.

The novel composition of the invention comprises:
from 65 to 98 weight percent of hot and cold water soluble polyvinyl alcohol (86% to 88% hydrolyzed, preferably).
from 1 to 35 weight percent of at least one plasticizer of the glycol or polyol type including glycerol, hexanediol, triethylene glycol, trimethylol propane
from 0.1 to 5 weight percent of a borate salt of sodium or potassium.

In the practice of the invention, absorption of the plasticizer by the resin is facilitated by heating the plasticizer mixture to around 150° F degrees. Alternatively, the borate can be added to the plasticizer and the resulting mixture then mixed with the polyvinyl alcohol. This mixture in turn can be colored or uncolored.

The invention is illustrated in a non-limiting way by the following examples.

EXAMPLE 1

A mixture was made from:

| | |
|---|---|
| PVA - partially hydrolyzed 86–88% hydrolysis | 1 lb. |
| Glycerine | 0.24 lbs |
| Sodium borate | 4.5 grams |

EXAMPLE 2

A mixture was made from:

| | |
|---|---|
| Polyvinyl Alcohol (86%–88% hydrolysis) | 1 lb. |
| 1-6 Hexanediol | 0.12 lbs. |
| Propylene glyceol | 0.06 lbs. |
| Triethylene glycol | 0.06 lbs. |
| Sodium borate | 9.0 grams |

The above mixtures were fed into 1 ¾ inch extruder with an L/D ratio of 20:; screw compression ratio of 3.5:1 through a 6 inch diameter bottom fed die with a 20 ml die slot opening.

The following conditions were used for extrusion.

| | |
|---|---|
| Extruder screw speed | 35 R.P.M. |
| Temperatures | |
| Heater zone I | 350°F |
| Heater zone II | 375°F |
| Die ring heater | 325°F |
| Die collar heater | 325°F |
| Adapter | 345°F |
| Die slot opening | 20 mils |
| Blow up ratio | 2.2-1.0 |
| Film thickness | 1.5 mils |

There is produced under these conditions, a film which is insoluble in small amounts of cold water but soluble when flushed in water which was clear, uniform and free of defects.

In the accompanying drawing forming part hereof, identical parts have been given the same reference numerals, in which drawings.

Figure 1:
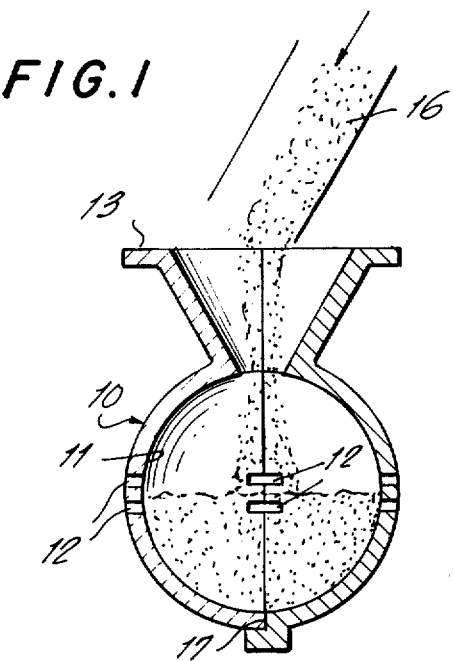
FIG. 1 is a diagrammatic vertical cross sectional view of a mold showing the first step in one use of the present invention.
Figure 2:
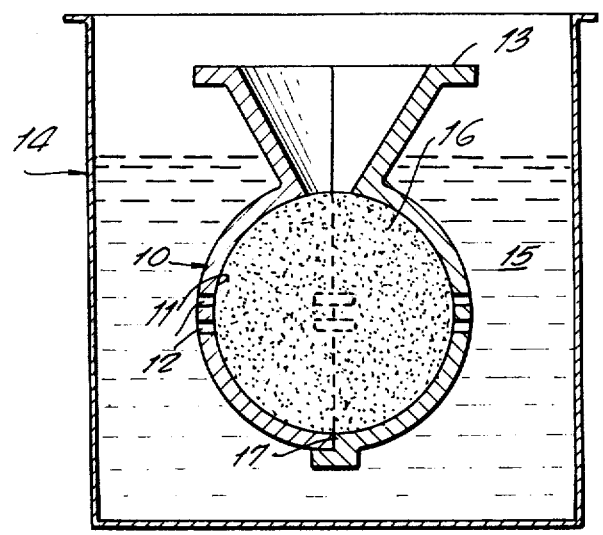
FIG. 2 is a view similar to FIG. 1 showing a second step.
Figure 3:
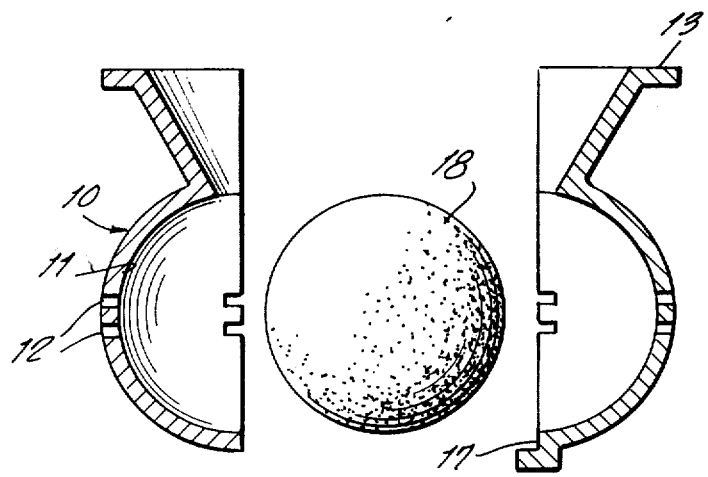
FIG. 3 is a view similar to FIG. 1 showing the third and final step.

Referring to the drawing; 10 indicates a mold suitable for shaping the plastic composition of the invention into various resilient objects. As shown, this apparatus includes a cavity 11 having a plurality of water admitting openings 12 and a handle 13 for dipping the mold into tank 14 which contains water 15 (FIG. 2).

After sufficient water has been absorbed into the plastic composition 16, the mold may be separated along its parting line 17 to release the object 18.

While not wishing to be bound by any theory, the observed data appears to indicate that when water contacts the resin of the invention, it begins to dissolve the polyvinyl alcohol component thereof. However, the borate dissolves simultanously and gels the polyvinyl alcohol thus arresting its solution process. In the presence of large volumes of water, the borate salt continues to be leached out of the resin since it is water soluble and when its concentration in the resin is low enough, the polyvinyl alcohol dissolves completely. Consequently, by increasing or decreasing the borate concentration in the plastic, it is possible to vary the amount of water which will dissolve the plastic.

The compositions of the invention readily can be shaped in the presence of water to give objects having surprising properties. Thus mixtures having the compositions set forth in Examples 1 and 2 were poured into the mold 10 shown. The mold was closed and immersed in water for 30 seconds. Ball-shapes were made which had 60-80% rebound.

An advantageous feature of the above shaping technique which depends on the plastic's great water absorbancy is that coloring agents can be added to the water into which the perforated mold is immersed with the result that the shaped articles will come out of the mold with the color desired. The shaped articles tend to dry with time and they do lose some resiliency. However, by immersing them again in water for a few seconds, their resiliency returns.

The properties of the plastic of the invention render it suitable for forming the barrier films for sanitary napkins, disposable diaper liners, bed pan liners, hospital laundry bags, cholostomy bags, disposable garments, and toys of various sorts.

What is claimed is:

1. A composition of matter characterized by insolubility in small volumes of water and solubility in larger volumes of same, (comprising) consisting essentially of from 65 to 98 weight % of hot and cold water soluble, partially hydrolized polyvinyl alcohol: the degree of hydrolysis of said alcohol being such as to impart said insolubility and solubility to said composition and being at least 86%; from 0.1 to 35 weight % of at least one plasticizer; and from 0.1% to 5% of a (metal) borate salt (.) of sodium or potassium.

2. The composition of claim 1, wherein said polyvinyl alcohol is from 86% to 88% hydrolyzed.

3. A shaped article formed from the composition of claim 1.

4. The composition of claim 1 wherein said plasticizer is selected from the group of glycerol, hexanediol, triethylene glycol, trimethylol propane, propylene glycol and mixtures thereof.

5. The composition of claim 1, consisting of:

| | |
|---|---|
| polyvinyl alcohol | 1 pound |
| glycerine | 0.24 pounds |
| sodium borate | 4.5 grams. |

6. The composition of claim 1, consisting of:

| | |
|---|---|
| polyvinyl alcohol | 1 pound |
| 1-6 hexanediol | 0.12 pound |
| propylene glycol | 0.06 pound |
| triethylene glycol | 0.06 pound |
| sodium borate | 9.0 grams. |

* * * * *